United States Patent
Ariznavarreta Esteban et al.

(10) Patent No.: US 7,744,150 B2
(45) Date of Patent: Jun. 29, 2010

(54) ROOF LINER AND PROCEDURE FOR OBTAINING A ROOF LINER FOR VEHICLES

(75) Inventors: Anselmo Ariznavarreta Esteban, Burgos (ES); Francisco Javier Morente Manero, Burgos (ES)

(73) Assignee: Groupo Antolin-Ingenieria, S.A., Burgos (ES)

( * ) Notice: Subject to any disclaimer, the term of this patent is extended or adjusted under 35 U.S.C. 154(b) by 248 days.

(21) Appl. No.: 11/774,484

(22) Filed: Jul. 6, 2007

(65) Prior Publication Data
US 2009/0174227 A1     Jul. 9, 2009

(30) Foreign Application Priority Data
Jul. 11, 2006    (EP) ................................. 06380195

(51) Int. Cl.
*B62D 39/00*   (2006.01)
(52) U.S. Cl. ..................................... 296/214
(58) Field of Classification Search ................ 296/214, 296/210; 156/222, 245, 221, 212; 181/284, 181/286, 290, 291, 294; 264/321, 46.8, 258; 428/131, 137, 138, 220, 317.5
See application file for complete search history.

(56) References Cited

U.S. PATENT DOCUMENTS

| | | | |
|---|---|---|---|
| 4,695,501 A | 9/1987 | Robinson | |
| 4,798,756 A | 1/1989 | Fukushima et al. | |
| 4,840,832 A | 6/1989 | Weinle et al. | |
| 5,007,976 A | 4/1991 | Satterfield et al. | |
| 5,258,585 A | 11/1993 | Juriga | |
| 5,536,556 A | 7/1996 | Juriga | |

FOREIGN PATENT DOCUMENTS

| | | |
|---|---|---|
| EP | 0832787 | 4/1998 |
| ES | 2157725 | 8/2001 |
| WO | WO 96/02589 | 2/1996 |

OTHER PUBLICATIONS

European Search Report dated Sep. 21, 2006 for Priority Application No. EP 06380195.

*Primary Examiner*—Lori L Lyjak
(74) *Attorney, Agent, or Firm*—Knobbe Martens Olson & Bear LLP

(57) ABSTRACT

The procedure comprises the following steps:
 a) joining a foam layer (1) and a plastic fibre mat (2);
 b) joining a plurality of additional layers (3, 4, 5, 6) to the central core (1, 2), joining at least one of said additional layers (3, 4, 5, 6) to the central core by a second thermostable adhesive (8, 9);
 c) applying pressure and heat to the product to give it a predetermined configuration and to polymerize the adhesive.

The invention also relates to a roof liner.

27 Claims, 4 Drawing Sheets

ROOF LINER AND PROCEDURE FOR OBTAINING A ROOF LINER FOR VEHICLES

CROSS-REFERENCE TO RELATED APPLICATIONS

The present application claims the benefit under 35 U.S.C. 119(a)-(d) of European Patent Application No. 06380195.5, filed on 11 Jul. 2006, the entire contents of which are incorporated herein by reference.

TECHNICAL FIELD OF THE INVENTION

The invention lies in the field of roof liners for vehicles.

BACKGROUND OF THE INVENTION

Vehicle roof liners are generally made of a laminar structure comprising a plurality of layers conformed to the shape of the corresponding vehicle roof. For example, a typical roof liner can comprise one layer (for example of fabric) on the exposed surface (i.e. the surface facing the interior of the vehicle), at least one intermediate reinforcement layer (normally made of fibreglass) and one structural layer (normally of semi-rigid, low density polyurethane foam or polyester). Generally, a paper layer is disposed on the hidden surface, made of a non-fabric polythene or the like, or nothing at all is disposed. Some or all of the intermediate layers (this is, those between the layer corresponding to the exposed surface and that corresponding to the hidden surface) can be duplicated, their order may be changed and additional layers may be added according to the specific properties desired for the liner. In addition, between the layers (or between some of the layers) an adhesive can be present to keep the layers joined to each other. For example, it is common to use two reinforcement layers of fibreglass, one on either side of the structural layer.

The laminate layers can be joined by an adhesive (such as by a thermosetting resin) applied on the structural layer. Document ES-A1-2157725 describes an example of a liner of this type. Another example of the state of the art is EP-A-0832787.

It has been found that in certain areas of this type of liners (such as in areas of low thickness and embeddings) it may be necessary to use a greater amount of fibreglass, at specific places, to reinforce the liner. These reinforced layers also tend to have poor acoustic properties (in the sense that they do not conform to the acoustic requirements for internal auto parts; the liners should be good noise absorbers). Therefore, it is considered desirable to obtain liners with good acoustic properties and a high, reasonably homogenous stiffness, while having a reasonable cost of production. That is, a good ratio between acoustic properties, stiffness and cost is searched for.

U.S. Pat. No. 4,840,832 describes a roof liner with a central core made of a mat of PET (polyethylene terephthalate) fibres on which a small foam layer is placed (optionally) to improve the appearance of the liner (as it corrects the small irregularities that can appear in the fibre mat), to improve the acoustic properties and provide a soft feel to the user.

In this case, the foam layer employed has no structural function, as its function is strictly aesthetic, so that it could consist of the foam layer integrated in certain trilaminate exposed surface liners formed by the fabric (polyester), the foam layer (polyurethane) and a thermoplastic film. The function of the foam is mainly to provide a soft feel to the user.

U.S. Pat. No. 5,258,585 describes a laminate useful as a roof liner for vehicles. The laminate comprises a central core formed by a fibrous mat and a foam layer that can be joined by an adhesive layer activated by heat. In addition, the laminate has a fibrous reinforcement layer (polyester fibres and, optionally, fibreglass) and a coating layer (which in turn can consist of a foam layer and another fabric layer). Moreover, the laminate can comprise a polyethylene layer with orifices for improving the absorption of low frequency sounds.

The laminate has been designed considering its acoustic properties: the central core absorbs the high-frequency sounds and the polyethylene layer absorbs the low-frequency sounds.

To manufacture the laminate, the various layers comprising it are joined, the set is passed through an oven before pressing and it is then cold-formed. This is, it is a thermoplastic process: the adhesive used is a thermoplastic film, which allows heating before forming (to activate the adhesive) and then forming in a cold mould, which can be convenient.

U.S. Pat. No. 5,536,556 also describes an acoustic laminate for automobile liners.

DESCRIPTION OF THE INVENTION

Although the use of thermoplastic resins as an adhesive in applications as those described in U.S. Pat. No. 5,258,585 may seem as the best option from certain points of view, it has been found that their use can lead to problems. Although the available thermoplastic resins can work well (this is, without acquiring a plastic state implying a risk of loss of dimensional stability of the assembly) in the conditions to which the liner is generally subjected, situations can arise in which the resins, when heated, acquire said plastic state with the resulting risk of deformations or loss of dimensional stability of the assembly. For example, this has been found to occur when the liners are subjected to certain tests in weather chambers.

Therefore, it has been considered that there is a need to provide a system that allows using a layer or mat of plastic fibres (such as PET fibres) to obtain a core with an even rigidity and good acoustic properties, that can also be subjected to high temperatures without the risk of dimensional stability loss.

One aspect of the invention is the use of a two-layer central core composed of a semi-rigid foam and a mat of plastic fibres. A thermosetting adhesive is applied to these layers so that they are superficially impregnated. Subsequently, by applying heat and pressure, the adhesive penetrates to the core of each layer providing a structure of a high and even stiffness that allows using the liner in a wide range of temperatures, such as in weather chamber tests.

An object of this invention is to obtain a roof liner with a high and even stiffness with good acoustic properties.

One aspect of the invention relates to a procedure for obtaining a roof liner for a vehicle, comprising the following steps:

a) joining a foam layer and a mat of plastic fibres using a first adhesive placed between said foam layer and said mat, to form a central core comprising said foam layer and said mat;

b) joining a plurality of additional layers (such as reinforcement layers, one or more coatings, etc.) to the central core to form a layered product comprising said central core and said additional layers, joining at least one of said additional layers to the central core by a second adhesive;

c) applying pressure to the layered product in a press to give it a predetermined configuration.

According to the invention, the second adhesive (and optionally also the first adhesive) comprises a thermosetting adhesive, and in step c) heat and pressure are both applied in the press in order to produce a substantial polymerisation of the second adhesive (and, if applicable, of the first adhesive, etc.).

In this way, the substantial polymerisation of the adhesive sets a "definitive" shape of the core, and as a thermosetting adhesive is used, this shape—as well as the union between the relevant layers—is maintained even in the case that the liner is subjected to a temperature higher than the usual ambient temperatures. In addition, a high and even stiffness as well as good acoustic properties (with preference given to acoustic absorption) are easily obtained.

The first adhesive can also be or comprise a thermosetting adhesive, although it is possible to use a different type of adhesive. Its main purpose can be to join the foam layer and the mat of plastic fibres in a way that allows its simple handling during the process.

At step b), according to a possible embodiment of the invention, the second adhesive is applied to the free greater surfaces (this is, when the core is in a "horizontal" position in relation to the upper and lower surfaces) of the central core in order to join additional layers to said central core. These additional layers can be created by depositing, for example, reinforcement fibres (such as fibreglass or other suitable fibres) on this second adhesive so that, when the adhesive is activated, the corresponding reinforcement layer will be created (such as by a layer of fibreglass and adhesive). This second adhesive (which can be identical to the first adhesive or of a different type) is a thermosetting resin, as stated above. This second adhesive can also be used to join the coating of the exposed surface and/or the coating of the hidden surface to the core.

In step a), the mat of plastic fibres can have a grammage, or weight per unit surface, equal to or greater than 100 g/m$^2$ and equal to or less than 500 g/m$^2$. A weight in this range is considered adequate for providing the liner with good strength and sound insulation characteristics.

The procedure can comprise the step of placing a reinforcement layer (such as fibreglass, natural fibres, etc.) between the foam layer and the mat of plastic fibres; this layer can be placed, for example, on the foam layer in the aforementioned step a).

In step a), the mat of plastic fibres can be a non-woven mat, for example, it can comprise plastic fibres interlinked to constitute a set of fibres joined mechanically without adhesive. This type of material can be of the type known as a "non-woven fibre mat", such as of the type described in U.S. Pat. No. 5,258,585 and U.S. Pat. No. 5,536,556.

At least one part of the plastic fibres (such as 90% or more of them) can be of PET (polyethylene terephthalate). There may be recycled fibres, for example, from 0% to 100% of the fibres can be recycled, although preferably from 10% to 30% of the mat fibres should be recycled fibres.

In step a) the density of the foam layer can for example be greater than or equal to 10 kg/m$^3$ and less than or equal to 45 kg/m$^3$.

The foam layer can be a semi-rigid layer.

The foam layer can be, for example, a polyurethane layer.

The second adhesive (and, optionally, the first adhesive) can be a thermosetting resin, for example with an isocyanate base.

According to a possible execution of the invention, in step b) at least one reinforcement layer is applied in correspondence with a first surface of the central core, and at least one reinforcement layer in correspondence with a second surface of the central core. As stated above, one or both of these reinforcement layers can be natural or mineral reinforcement fibres, such as basalt and fibreglass. Alternatively or complementarily, one or both of the reinforcement layers can be a PET film.

The mat of plastic fibres can be obtained before step a) by cutting a roll of the corresponding material of interlinked plastic fibres. Mats can be cut from the roll in synchrony with the rest of the manufacturing process of the liner, eliminating the need for a space in which to store these cut mats.

On another hand, before step a) and according to a possible execution of the invention, a stack of parts or stacked foam layers can be disposed so that the foam layer is obtained from said stack of foam layers.

The additional layers of step b) can comprise at least one reinforcement layer, one coating for the hidden surface and, in one alternative of the invention, a coating of the exposed surface. In this case the coating of the exposed surface shall be present when the layered product is introduced in the press.

However, for technical reasons of the process, such as difficulty in extraction from the mould, need to trim the coating of the exposed surface, etc. it may also be applied after step c).

Another aspect of the invention relates to a roof liner for a vehicle, obtained and/or obtainable by the procedure according to the above description.

Another aspect of the invention relates to a roof liner for a vehicle that comprises:
a central core comprising a foam layer and a mat of plastic fibres joined by a first adhesive placed between said foam layer and said mat;
b) a plurality of layers joined to the central core, at least one of said additional layers being joined to the central core by a second adhesive.

Said second adhesive (8,9) comprises a thermosetting adhesive.

The above statements regarding the procedure are also applicable to the product, mutatis mutandis.

For example, said second adhesive can be applied to the greater surfaces of the central core in order to join the additional layers to said central core.

The first adhesive can also comprise a thermosetting adhesive.

In addition, the liner can comprise a reinforcement layer between the foam layer and the mat of plastic fibres.

DESCRIPTION OF THE DRAWINGS

To complete the description and in order to aid a better understanding of the characteristics of the invention, according to an example of a preferred embodiment thereof, a set of drawings is accompanied forming an integral part of the description where, for purposes of illustration and in a non-limiting sense, the following is shown.

PREFERRED EXECUTION OF THE INVENTION

Figure 1:
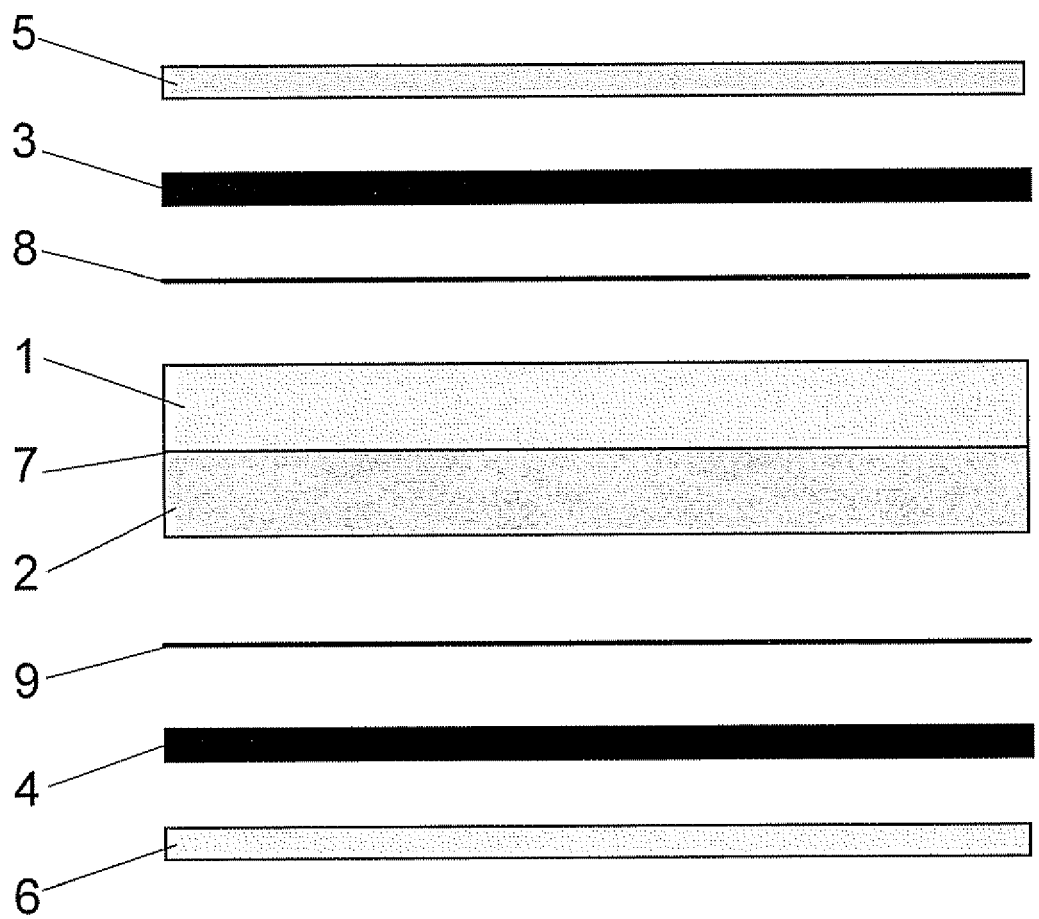
FIG. 1 shows a schematic representation of the layers that can comprise a liner obtained by the procedure of the invention.

FIG. 1 shows schematically the structure of a liner according to a possible execution of the invention. It can be seen that the liner is based on a core comprising a foam layer 1 of polyurethane, to which is adhered, by a first adhesive 7 that comprises a thermosetting resin, a mat 2 of PET type plastic fibres, which comprises mechanically interlinked fibres. In this way a core is established with good acoustic properties that can help provide a high and homogenous stiffness to the liner.

On top of the foam layer 1 is a layer of a thermosetting adhesive 8 (specifically resin) that allows joining the foam layer 1 to a reinforcement layer 3 of fibreglass and to a coating 5 for the hidden surface, which can be made of paper or cardboard, for example.

On another hand, a layer of thermosetting adhesive 9 (resin) is applied to the mat 2 of plastic fibres to join a reinforcement layer 4 of glass fibres and a coating 6 of the exposed surface (that can be a fabric) to the central core.

According to a preferred execution of the invention, the process for obtaining the liner can be divided into two main phases:

a first phase corresponding to the preparation of the central core; and a second phase corresponding to the addition of the remaining layers and the conformation of the assembly.

To prepare or establish the central core, a form (this is, a part with the dimensions adapted to those of the final product) of the mat 2 of plastic fibres is first cut. The initial item may be a large mat of material of plastic fibres interlinked mechanically supplied as a roll. The part 2 can be cut from this roll to the required dimensions, adapted to those of the final product.

On another hand, a foam form (i.e. a piece of foam with dimensions adapted to the final product) is taken. The foam forms can be stacked in one of the areas of the installation. This foam form will constitute the foam layer 1 (for example of polyurethane).

Figure 2:
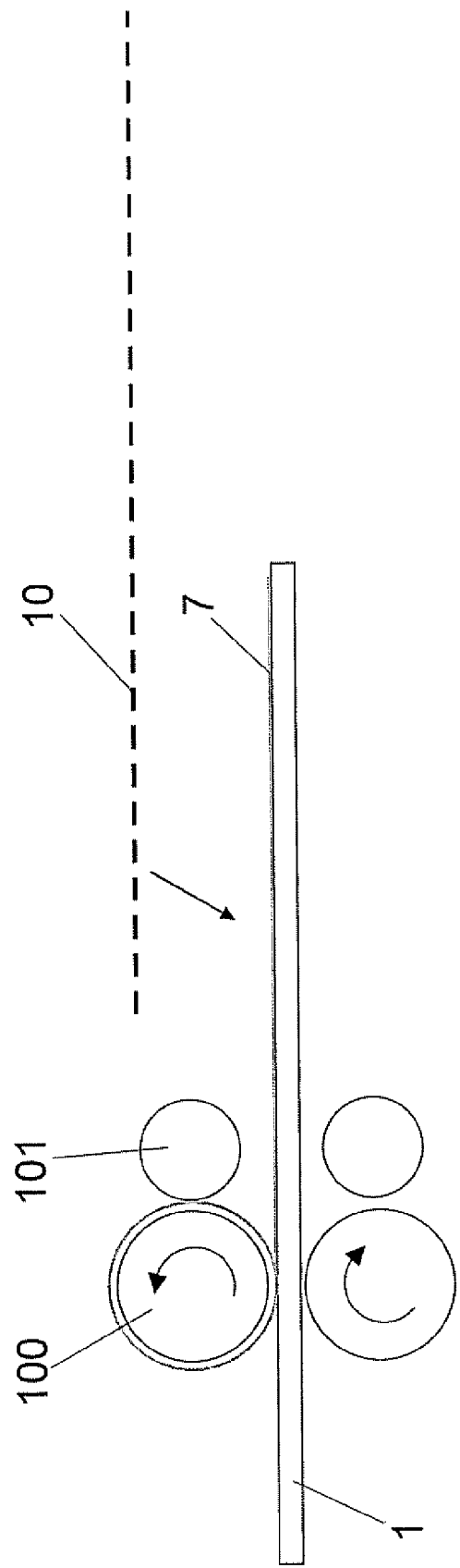
FIGS. 2-4 show schematically some steps of the procedure according to a possible execution of the invention.

Next, as shown schematically in FIG. 2, the foam layer 1 is passed through an adhesive application system, such as a glue roller, to apply a layer of thermosetting resin 7 to one of the surfaces of the foam layer 1 by means of an application roller 100 and a dosing roller 101.

Figure 3:
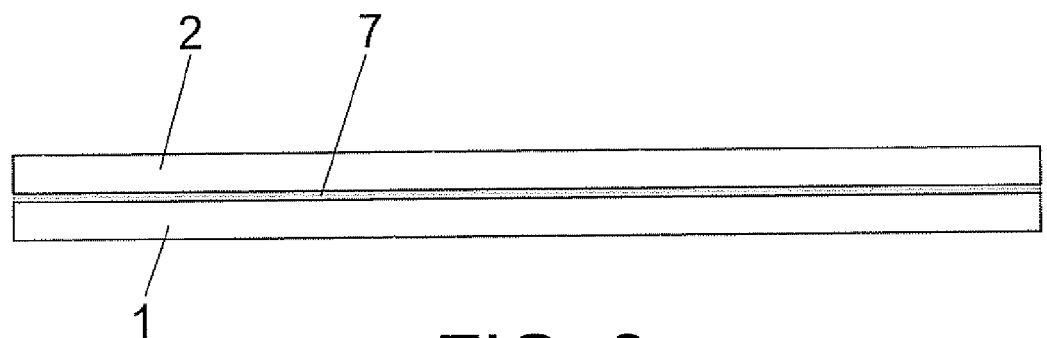
Figure 4:
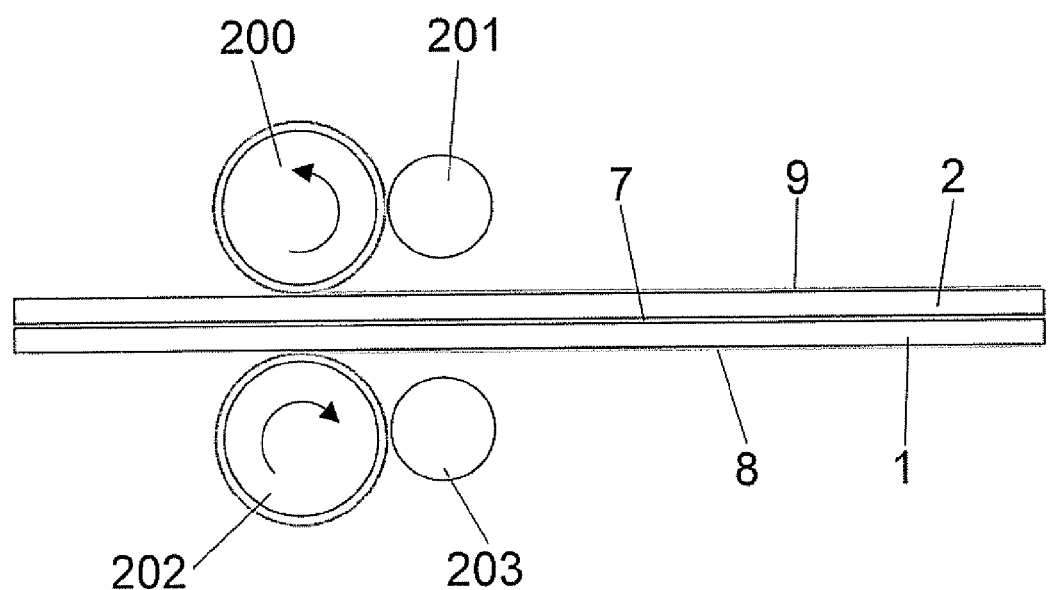

Then, the mat 2 of plastic fibres is placed on the foam layer 1 so that the layer of thermosetting adhesive 7 is between the mat 2 and the foam layer 1 (FIG. 3).

In a later phase of the process, adhesive is applied to the assembly constituted by the central core (this is, the set made up of the mat 2 and the foam layer 1, with the thermosetting adhesive 7 between them) in a superficial manner, such as by a gluer with rollers (which may include application rollers 200, 202 and dosing rollers 201, 203) so that two layers of adhesive 8, 9 are established on the corresponding surfaces of the central core.

Then the remaining layers are applied, such as by the following steps:

Taking a form of coating for the hidden surface 5 (such as cardboard or paper)

Depositing the reinforcement fibres (which, together with the adhesive, will constitute a reinforcement layer 3) on the hidden surface coating 5 and, optionally, depositing a catalyst (for example, water to activate the thermosetting resin adhesive layer 8); in a possible alternative embodiment, the catalyst can be incorporated in the resin when the latter is applied on the core.

Placing the central core (mat 2+foam layer 1) on the set formed by the coating of the hidden layer 5, the reinforcement fibre layer 3 and the catalyst (when applicable).

Adding a catalyst (optional; a possible catalyst is water) and reinforcement fibres (to form another reinforcement layer 4) on the other surface of the central core (mat of plastic fibres+foam), on the corresponding adhesive layer 9.

Adding the exposed surface layer 6.

Forming in a hot press, defining the shape of the final product and polymerising the layer of thermosetting resin 7 of the core, as well as the other adhesive layers 8, 9.

In an alternative mode of the invention, the exposed surface coating can be applied after the press forming phase due to technical process reasons such as a difficult mould removal, need to trim the coating of the exposed surface, etc. In such a case, it is possible to apply another type of layer on the reinforcement layer 4 to prevent the adhesive from contacting the contact surfaces of the press.

Figure 5:
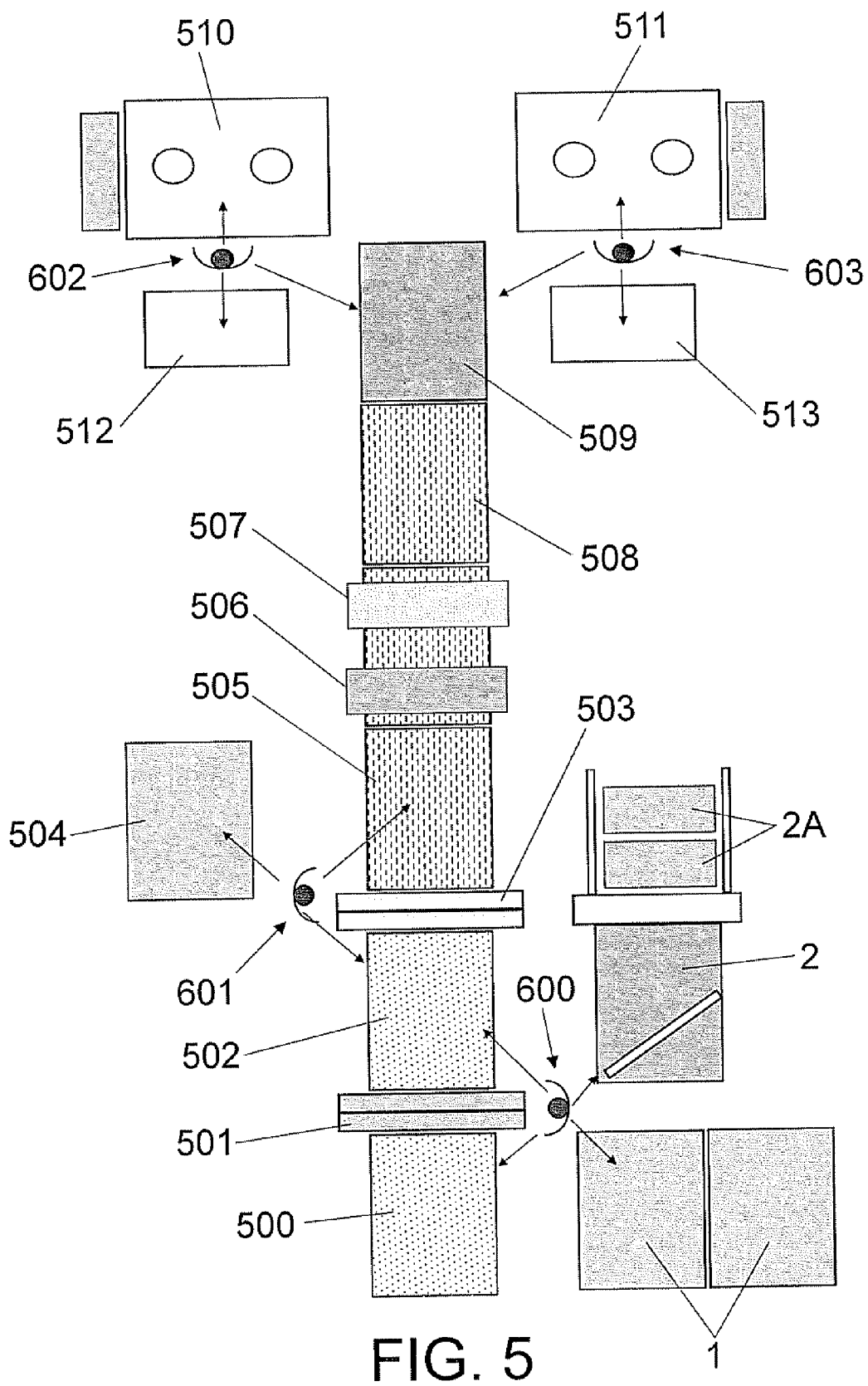
FIG. 5 shows schematically an installation adapted to perform a procedure according to a possible execution of the invention.

FIG. 5 schematically illustrates an installation to implement the invention with the stations corresponding to each step of the process described below.

In a first step, material is cut from rolls 2A of material composed of PET plastic fibres, obtaining mats 2 of said plastic fibres; the fibres are interlinked and form an agglomerate without the need for adhesive. This type of material is known as a mat of non-woven fibre and can be of the type described in U.S. Pat. No. 5,258,585 and U.S. Pat. No. 5,536, 556.

Each mat 2 that is cut can be placed in an area near an operator or robot 600, as shown schematically in FIG. 5. The cutting of mats 2 from the rolls 2A can be performed in synchrony with the other process steps to prevent the need to store cut mats 2; each mat can be cut just before the step involving applying it on the foam layer 1. The plastic fibre mats 2 are cut so that they constitute forms with the dimensions adapted to the final product.

On another hand, stacks are made of the layers (or forms) of foam 1 (such as polyurethane or the like). For practical reasons, these layers, with the suitable form for the final product and a typical thickness of 4-15 mm, are generally produced separately in a prior process and therefore must be stored, such as in stacks. At least one of the stacks must be near the aforementioned operator or robot 600, as shown schematically in FIG. 5.

In a next step the operator or robot 600 deposits a form or layer of foam 1 on a foam loading area 500, after which is placed a set of rollers 501 for impregnating a thermosetting adhesive, where said adhesive is applied on the upper surface of the foam layer; according to the invention, this adhesive is a thermosetting resin.

On another hand, at the outlet 502 of the rollers 501 the robot or operator 600 places the mat 2 cut from the corresponding roll on the upper surface of the foam layer 1. This assembly then passes through other rollers 503 for applying adhesive, by which thermosetting adhesive is applied to the top and bottom surfaces of the core comprising the foam layer 1 and mat 2 of plastic fibres. The pressure exerted by the rollers 503 makes the resin penetrate the corresponding surfaces of the core to a considerably depth.

On yet another hand, an operator or robot 601 takes a coating of the hidden surface from a stack 504 of hidden surface coatings (for example paper or the like), and places it on a working area 505 from where it is carried automatically through a station 506 where a catalyst is applied if necessary (such as water), the catalyst later being left on the upper surface of the hidden surface to be later used to activate the thermosetting adhesive on the bottom surface of the central core integrated by the foam layer 1 and the mat 2.

Next, the hidden surface coating passes another station 507 where reinforcement fibres (such as glass fibres) are applied to the coating.

On another hand, at a different work stage, the core integrated by the foam layer 1 and the mat 2 passes through said stations 506 and 507, so that the catalyst and reinforcement fibres are also deposited on the upper surface of the core, creating the base for the reinforcement layer 4 placed under the hidden surface coating (see FIG. 1).

In this way the same stations 506 and 507 can be used for the two layers of catalyst and reinforcement fibres (layers 3 and 4 in FIG. 1); this is, for the reinforcement layers on both sides of the core.

The reinforcement fibre applied in station 507 can be a roving type fibre. This type of fibre is stored in rolls and is cut and applied directly on to the corresponding surface.

In another workstation 508 the core is placed (for example automatically) on the hidden surface coating, so that the reinforcement fibres and catalyst are between the core and said coating and in contact with the resin deposited on the bottom surface (in this case corresponding to the surface of the foam layer 1) of the core.

In a subsequent workstation or area 509 the laminated product is collected, in this case without the exposed surface coating (it is also possible to apply a coating to the exposed surface at this stage, but it may be preferable to do so after the pressing stage). Two operators or robots 602, 603 pass the laminated product into corresponding presses (510, 511) (using two presses instead of one can increase the production speed and the efficiency of the installation, as due to the need to cause the polymerisation of the adhesive it may be convenient to leave the product in the press for a longer time than the product spends in the previous stations), where the stratified product is subjected to pressure and heat, giving the final shape to the product and polymerising the thermosetting adhesive. Subsequently, the same operators (602, 603) can apply the exposed surface coating to the laminated product at corresponding stations 512, 513, obtaining the final liner.

In this text, the term "comprises" and its forms (such as "comprising", etc.) must not be interpreted in an excluding sense; this is, they do not exclude the possibility that what is described includes other components, steps, etc.

In addition, the invention is not limited to the specific executions described herein, but also extends to, for example, variations that may be introduced by an average expert in the field (such as in the choice of materials, dimensions, components, configuration, etc.) within the scope of the claims.

The invention claimed is:

1. Procedure for obtaining a roof liner for a vehicle, comprising the following steps:
    a) joining a foam layer and a mat of plastic fibres using a first adhesive placed between said foam layer and said mat, to form a central core comprising said foam layer and said mat;
    b) joining a plurality of additional layers to the central core to form a layered product comprising said central core and said additional layers, joining at least one of said additional layers to the central core by a second adhesive;
    c) applying pressure to the layered product in a press to give it a predetermined configuration;
    wherein
    said second adhesive comprises a thermosetting adhesive; and wherein
    in step c) pressure and heat are applied in the press to produce a substantial polymerisation of the second adhesive.

2. Procedure according to claim 1, in which, in step b), said second adhesive is applied on the greater free surfaces of the central core to join the additional layers to said central core.

3. Procedure according to claim 1, in which said first adhesive comprises a thermosetting adhesive.

4. Procedure according to claim 1, in which a reinforcement layer is placed between the foam layer and the mat of plastic fibres.

5. Procedure according to claim 1 in which, in step a), the mat of plastic fibres has a weight per unit surface greater than or equal to 100 g/m$^2$ and less than or equal to 500 g/m$^2$.

6. Procedure according to claim 1 in which, in step a), the mat of plastic fibres is a non-woven mat.

7. Procedure according to claim 6, in which, in step a), said mat of plastic fibres comprises plastic fibres interlinked to constitute a set of fibres joined mechanically without adhesive.

8. Procedure according to claim 1, in which said plastic fibres comprise PET fibres.

9. Procedure according to claim 8, in which at least 90% of said plastic fibres are PET fibres.

10. Procedure according to claim 1, in which from 10% to 30% of said plastic fibres are recycled fibres.

11. Procedure according to claim 1 in which, in step a), the foam layer has a density greater than or equal to 10 kg/m$^3$ and less than or equal to 45 kg/m$^3$.

12. Procedure according to claim 1, in which the foam layer is a semi-rigid layer.

13. Procedure according to claim 1, in which the foam layer is a polyurethane layer.

14. Procedure according to claim 1, in which the second adhesive is a thermosetting resin.

15. Procedure according to claim 1, in which in step b) at least one reinforcement layer is applied in correspondence with a first surface of the central core, and at least one reinforcement layer is applied in correspondence with a second surface of the central core.

16. Procedure according to claim 15, in which at least one of said reinforcement layers is a layer of natural or mineral reinforcement fibres.

17. Procedure according to claim 15, in which at least one of said reinforcement layers is a PET film.

18. Procedure according to claim 1, in which, before step a), the mat of plastic fibres is obtained by cutting it from a roll of interlinked plastic fibres material.

19. Procedure according to claim 1, in which, before step a), a stack of foam layers is disposed so that the foam layer is obtained from said stack of foam layers.

20. Procedure according to claim 1, in step b), said additional layers comprise at least one reinforcement layer and one hidden surface coating.

21. Procedure according to claim 1, in which in step b) said additional layers also comprise an exposed surface coating.

22. Procedure according to claim 1, in which an exposed surface coating is applied after step c).

23. Vehicle roof liner, obtained by the procedure according to claim 1.

24. Vehicle roof liner comprising:
    a central core comprising a foam layer and a mat of plastic fibres joined by a first adhesive placed between said foam layer and said mat;
    b) a plurality of additional layers joined to the central core, at least one of said additional layers being joined to the central core by a second adhesive;
    wherein
    said second adhesive comprises a thermosetting adhesive.

25. Roof liner according to claim 24, in which said second adhesive is applied on the greater surfaces of the central core to join the additional layers to said central core.

26. Roof liner according to claim 24, in which the first adhesive also comprises a thermosetting adhesive.

27. Roof liner according to claim 24, which additionally comprises a reinforcement layer between the foam layer and the mat of plastic fibres.

* * * * *